(12) United States Patent
Melander et al.

(10) Patent No.: US 8,898,221 B2
(45) Date of Patent: Nov. 25, 2014

(54) OPTIMIZED REDIRECTION FOR NETWORK ARCHITECTURES

(75) Inventors: Bob Melander, Sigtuna (SE); Ayodele Damola, Solna (SE); Jan-Erik Mångs, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 172 days.

(21) Appl. No.: 13/254,328

(22) PCT Filed: Mar. 19, 2009

(86) PCT No.: PCT/IB2009/005045
§ 371 (c)(1),
(2), (4) Date: Sep. 1, 2011

(87) PCT Pub. No.: WO2010/106390
PCT Pub. Date: Sep. 23, 2010

(65) Prior Publication Data
US 2011/0320554 A1    Dec. 29, 2011

(51) Int. Cl.
*G06F 15/16* (2006.01)
*H04L 29/08* (2006.01)
*H04L 29/06* (2006.01)

(52) U.S. Cl.
CPC ............. *H04L 67/104* (2013.01); *H04L 29/06* (2013.01); *H04L 29/08072* (2013.01)
USPC ............................ 709/203; 709/220; 709/224

(58) Field of Classification Search
CPC ..................... H04L 29/08072; H04L 29/06
USPC .......................................... 709/203, 220, 224
See application file for complete search history.

(56) References Cited

U.S. PATENT DOCUMENTS 7,155,526 B2 * 12/2006 Chaudhary et al. ........... 709/229
8,363,799 B2 * 1/2013 Gruchala et al. ........... 379/93.17
(Continued)

FOREIGN PATENT DOCUMENTS

| CN | 1671119 A | 9/2005 |
|---|---|---|
| JP | 2008299655 A | 12/2008 |
| WO | 2008/057509 A | 5/2008 |

OTHER PUBLICATIONS

International Search Report for International Application No. PCT/IB2009/005045 mailed Aug. 18, 2009.
(Continued)

*Primary Examiner* — Khanh Dinh
(74) *Attorney, Agent, or Firm* — Patent Portfolio Builders PLLC

(57) ABSTRACT

A system, computer readable medium and method for providing to a user device (20) location information of a data device that provides a specific asset, where the user device (20) is present in a network (32) that includes at least a serving node (36) and an address of the user device (20) is indicative of a gateway node (35) that is different from the serving node (36). The method includes receiving at the serving node (36) a first message from the user device (20), the first message including a request for the specific asset; sending the first message from the serving node (36) to the gateway node (35); receiving at the serving node (36) a second message from the gateway node (35), the second message including a first location of a first data device (44) that provides the specific asset; modifying at the serving node (36) the second message to include an indication about a second location of a second data device (46) that provides the specific asset, where the first location is different from the second location; and sending the modified second message including the second location to the user device (20) for accessing the specific asset.

21 Claims, 13 Drawing Sheets

(56) References Cited

U.S. PATENT DOCUMENTS

| | | | |
|---|---|---|---|
| 2003/0028623 A1 | 2/2003 | Hennessey et al. | |
| 2003/0028777 A1 | 2/2003 | Hennessey et al. | |
| 2011/0145317 A1* | 6/2011 | Serban et al. | 709/203 |
| 2011/0249658 A1* | 10/2011 | Wohlert et al. | 370/338 |
| 2011/0320554 A1* | 12/2011 | Melander et al. | 709/206 |

OTHER PUBLICATIONS

Written Opinion for International Application No. PCT/IB2009/005045 mailed Aug. 18, 2009.

International Preliminary Report on Patentability for International Application No. PCT/IB2009/005045 mailed Jul. 25, 2011.

http://www.akamai.com/, downloaded Sep. 1, 2011.

3GPP/GSM, "3rd Generation Partnership Project; Technical Specification Group Core Network and Terminals; General Packet Radio Service (GPRS); GPRS Tunnelling Protocol (GTP) across the Gn and Gp interface (Release 8)," 3GPP TS 29.060 v. 8.0.0, Technical Specification, Jul. 2007, pp. 1-143.

Japanese Office Action in related Japanese Patent Application No. 2012-500324, mailed on Jun. 7, 2013 (WO 2008/057509 was provided in a previous IDS).

Chinese Office Action in corresponding Chinese Application No. 200980158306.7 dated Nov. 26, 2013.

* cited by examiner

OPTIMIZED REDIRECTION FOR NETWORK ARCHITECTURES

TECHNICAL FIELD

The present invention generally relates to systems, software and methods and, more particularly, to mechanisms and techniques for redirecting a user device to a more suitable source of data.

BACKGROUND

During the past years, the access to Internet has made more and more people to use their computer or mobile phone or other device (user device) to download content, services, etc. from various service providers in order to watch movies, listen to songs, read the news, etc. Thus, content distribution networks (CDNs) have become common in the current Internet landscape. The CDNs provide mechanisms and network infrastructure that enable the service providers to improve the accessibility of the content to clients. FIG. 1 illustrates a system 10 having a client device 20 that connects to the service provider 30 to request content from the CDN 40.

Content may include web pages (and/or individual objects like images on web pages), video files and audio files. The clients may be persons surfing the web using a web browser or any other suitable application, e.g., a video streaming client. Improved accessibility in this context refers to lower delay, higher bandwidth and/or higher availability of the content, i.e., a reduction of the fraction of time during which the content is not available. A suitable source of content for the client device may be defined by a combination of these factors. Some known providers of CDN services at the time of filing this application are Akamai (see for example www.akamai.com) and Limelight (see www.limelight.com). Amazon has recently also entered into this market as part of their Web Services suite.

One feature of a CDN is to cache the required content close to the client, thereby reducing the time the client needs to fetch that content. For example, still with regard to FIG. 1, the CDN 40 may cache the content at cache 42. Another possibility is to provide another cache 44 closer to the client device 20. As the internet protocol (IP) is the networking protocol of the Internet and thus the one by which computers are globally interconnected, closeness may be defined in terms of IP router hops. Alternatively, the closeness may be defined based on a multitude of factors, one of which being measured in terms of the IP router hops. Another factor may be, for example, the cost of transporting bits across a certain link. Thus, all these factors may be considered into closeness metric. Hence, achieving closeness may translate into reducing the number of router hops from client to where the content is held.

While the simplicity of FIG. 1 suggests that the solution to the closeness problem is to place cache 44 closest to the client device 20, a more realistic situation may be as shown in FIG. 2, in which the client device 20 is roaming in Net A 32, which is a first service provider, but belongs to Net B 34, which is a second service provider. When the client device 20 requests certain content from the CDN 40, because the client device 20 belongs to Net B 34, a gateway node 35 of Net B 34 directs the request message to the CDN 40. The logic of the CDN 40 decides that the required content is to be found in cache 44 instead of cache 42 (i.e., the logic redirects the client device to cache 44 that is closer to the client device) and informs accordingly the gateway node 35. Next, the gateway node 35 transmits the position of the cache 44 to the client device 20 via Net A 32. Net A 32 includes a serving node 36 connected to a cache 46. Thus, the client device 20 will receive the desired content from cache 44, which in this situation is not the closest to the client device 20. The reason why the client device 20 downloads the content from cache 44 is discussed next.

FIG. 3 illustrates in more details the redirection functionality at the CDN 40 and the messages exchanged among the client device 20, the serving node 36, the gateway node 35, and the CDN 40. The client device 20 sends in step 1a request for location content. As the client device 20 is roaming in Net A 32, the serving node 36 forwards the request in step 2 to the gateway node 35, to which the client device 20 belongs. The gateway node 35 contacts the CDN 40 in step 3 to request the location of the desired content. The CDN 40 determines in step 4 the location of the desired content and informs in step 5 the gateway node 35 about the location of the desired content.

To determine the location of the desired content in step 4, the CDN 40 uses the IP address of the client device 20. More specifically, the CDN 40 applies some logic to the IP address of the client device 20 that takes into account where the CDN 40 has the requested content cached (cache 44 for example), and then the CDN 40 redirects the client device 20 to the best located cache with respect to the position of the client device 20.

This decision is thus largely affected by the IP address of the client device 20. The IP address of the client device 20 is extracted by the CDN 40 from the IP header of the request sent in step 1 by the client device 20. This approach works well if that IP address reflects the client device's true location in the IP domain. However, if the true location of the client in the IP domain is not accurately reflected in the IP address of the client device 20, this approach fails and the CDN 40 may not determine the closest cache to the client device 20.

One example in which the true location of the client device in the IP domain is not reflected in the IP address of the client device 20 is when there are IP tunnels involved so that the connectivity of the client device is somewhere tunneled. In this situation the client device 20 appears to be at one location but is in reality somewhere else. As a result, the cache 44 determined by the CDN 40 will be suboptimal and the benefits of the CDN 40 logic will be compromised.

An example of such a situation is when the client device obtains the connectivity from a $3^{rd}$ Generation Partnership Project (3GPP) mobile network. The architecture of 3GPP mobile networks is built around tunneling since the IP level mobility solution is GPRS Tunneling Protocol (GTP), the General Packet Radio Service (GPRS) tunneling protocol. In this network, the client is given an IP address that does not change and is topologically anchored in the gateway node 35, regardless of where the client device actually is located in the IP domain, i.e., regardless that the client device 20 is active inside Net A 32 and served by the serving node 36. Other networks that do not use the 3GPP architecture may also use an IP address for a client device that is not indicative of the real geographical location of the client device.

Returning now to FIG. 3, the CDN 40 having performed an inaccurate determination in step 4 of the closest cache 44 to the client device 20 (because of the IP problems discussed above), provides the inaccurate location to the gateway node 35 in step 5. The gateway node 35 transmits this location in step 6 to the serving node 36, which also transmits the location to the client device 20 in step 7. Having the location of the content, the client device 20 requests the desired content in step 8. The serving node 36 forwards the request in step 9 to the gateway node 35. The gateway node 35 downloads in step 10 the content from cache 44 and sends the content in step 11 to the serving node 36. The serving node 36 transmits that content in step 12 to the client device 20.

This example shows that those networks that use an IP address of the client device that does not correspond to the geographical position of the client device may not provide the closest cache to the client device as the cache 44 has been used instead of cache 46, which is closer than cache 44.

In the example discussed with regard to FIGS. 2 and 3, the CDN 40 included a Hypertext Transfer Protocol (HTTP) based redirection mechanism for determining that cache 44 is closer to the client device than cache 42. However, other protocols may be used in conjunction with the redirection mechanism. For example, FIG. 4 shows a system 12, similar to system 10 of FIG. 2, but with the difference that a domain name system (DNS) redirection mechanism is used by the CDN. The messages exchanged between the client device 20, the serving node 36, the gateway node 35 and the CDN DNS 41 are illustrated in FIG. 5. This oversimplified figure indicates that the client device 20 sends a message in step 1 for performing a DNS lookup for the address of a cache having the desired content. The CDN DNS 41 responds in step 2 with the address of the cache 44 having the desired content. Based on this information, the client device 20 sends in step 3 an HTTP "GET CONTENT" command to obtain the desired content and in step 4 receives the desired content.

In both examples illustrated in FIGS. 3 and 5 the redirection mechanism is located in the CDN 40 (either HTTP based or DNS based) and the IP address, of the client device 20, received by the CDN 40 does not correlate with the geographical location of the client device 20. For this reason, the CDN 40 fails to correctly inform the client device 20 about a cache 46 that is closer to the client device 20 than the determined cache 44.

Accordingly, it would be desirable to provide devices, systems and methods that avoid the afore-described problems and drawbacks.

SUMMARY

Assets as, for example, content are desired to be provided to the users from locations that are most suitable to the users. A suitable location may be a location that is closest to the user. In this way, receiving the content from a location closest to the user frees bandwidth in the network and/or reduces a time for receiving the asset.

According to one exemplary embodiment, there is a method for providing to a user device location information of a data device that provides a specific asset. The user device is present in a network that includes at least a serving node and an address of the user device is indicative of a gateway node that is different from the serving node. The method includes a step of receiving at the serving node a first message from the user device, the first message including a request for the specific asset, a step of sending the first message from the serving node to the gateway node, a step of receiving at the serving node a second message from the gateway node, the second message including a first location of a first data device that provides the specific asset, a step of modifying at the serving node the second message to include an indication about a second location of a second data device that provides the specific asset; and a step of sending the modified second message including the second location to the user device for accessing the specific asset.

According to another exemplary embodiment, there is a serving node for providing to a user device location information about a data device that stores a specific asset. The user device is part of a network that includes the serving node. The serving node includes an input/output interface configured to receive a first message from the user device, the first message including a request for the specific asset and a processor connected to the input/output interface. The processor is configured to receive a first message from the user device, the first message including a request for the specific asset, send the first message to the gateway node, receive a second message from the gateway node, the second message including a first location of a first data device that provides the specific asset; modify the second message to include an indication about a second location of a second data device that provides the specific asset, and send the modified second message including the second location to the user device for accessing the specific asset.

According to still another exemplary embodiment, there is a computer readable medium including computer executable instructions, wherein the instructions, when executed, implement a method for providing to a user device location information of a data device that provides a specific asset. The user device is present in a network that includes at least a serving node and an address of the user device is indicative of a gateway node that is different from the serving node. The method includes receiving at the serving node a first message from the user device, the first message including a request for the specific asset; sending the first message from the serving node to the gateway node; receiving at the serving node a second message from the gateway node, the second message including a first location of a first data device that provides the specific asset; modifying at the serving node the second message to include an indication about a second location of a second data device that provides the specific asset; and sending the modified second message including the second location to the user device for accessing the specific asset.

It is an object to overcome some of the deficiencies discussed in the previous section and to provide a serving node capable of discovering a more suitable location of a data device for a client user. One or more of the independent claims advantageously provides a reduced traffic load in the network as the asset may be exchanged between the user device and a closer data device, which also may reduce a downloading time.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of the 3GPP architecture. However, the embodiments to be discussed next are not limited to these systems but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
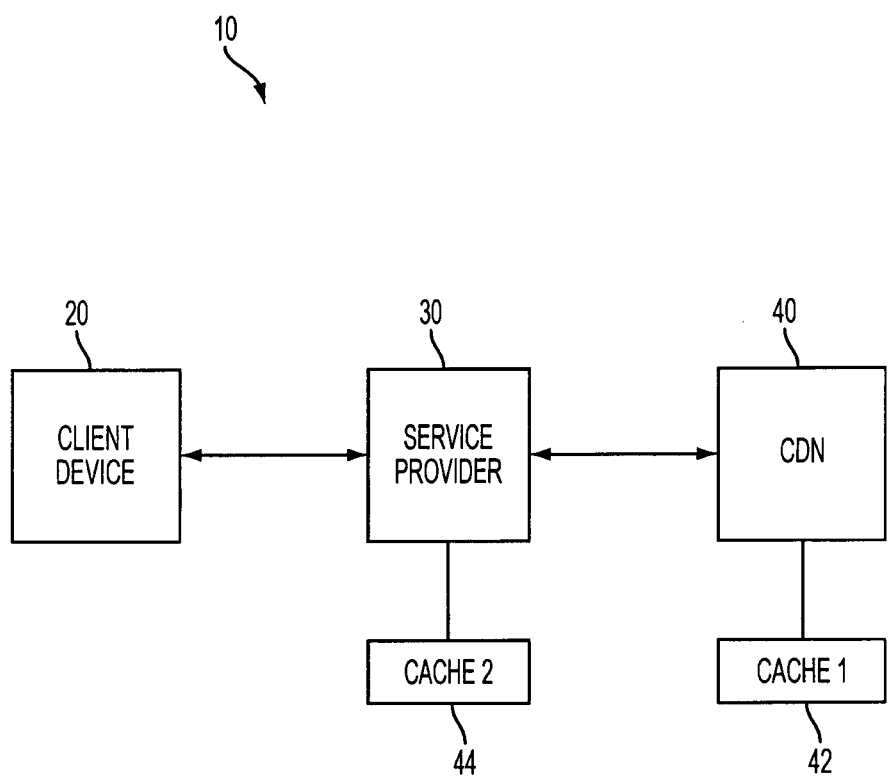
FIG. 1 is a schematic diagram of a system including a client device, a service provider, and content distribution network.
Figure 2:
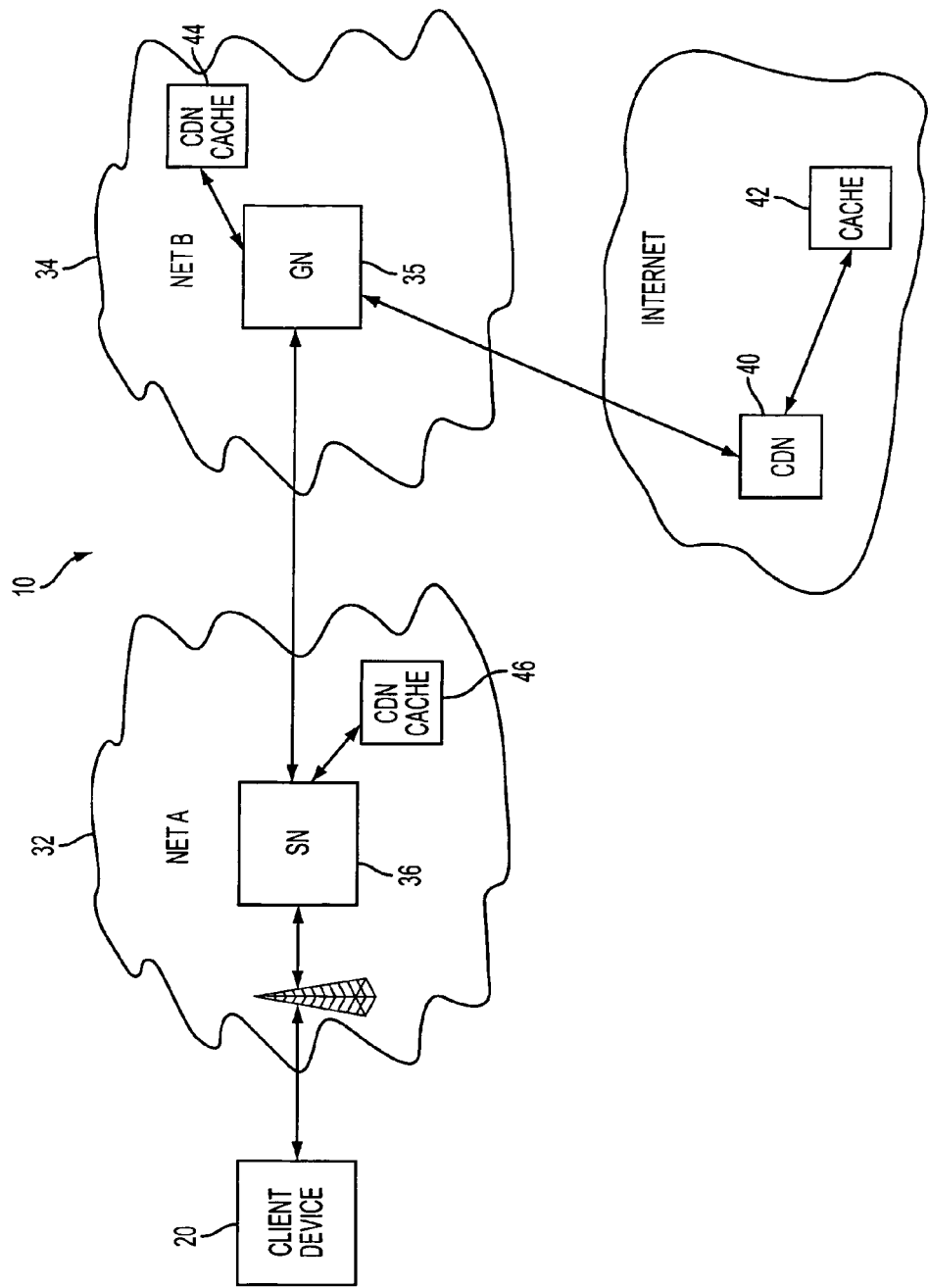
FIG. 2 is a more detailed schematic diagram of the system of FIG. 1.
Figure 3:
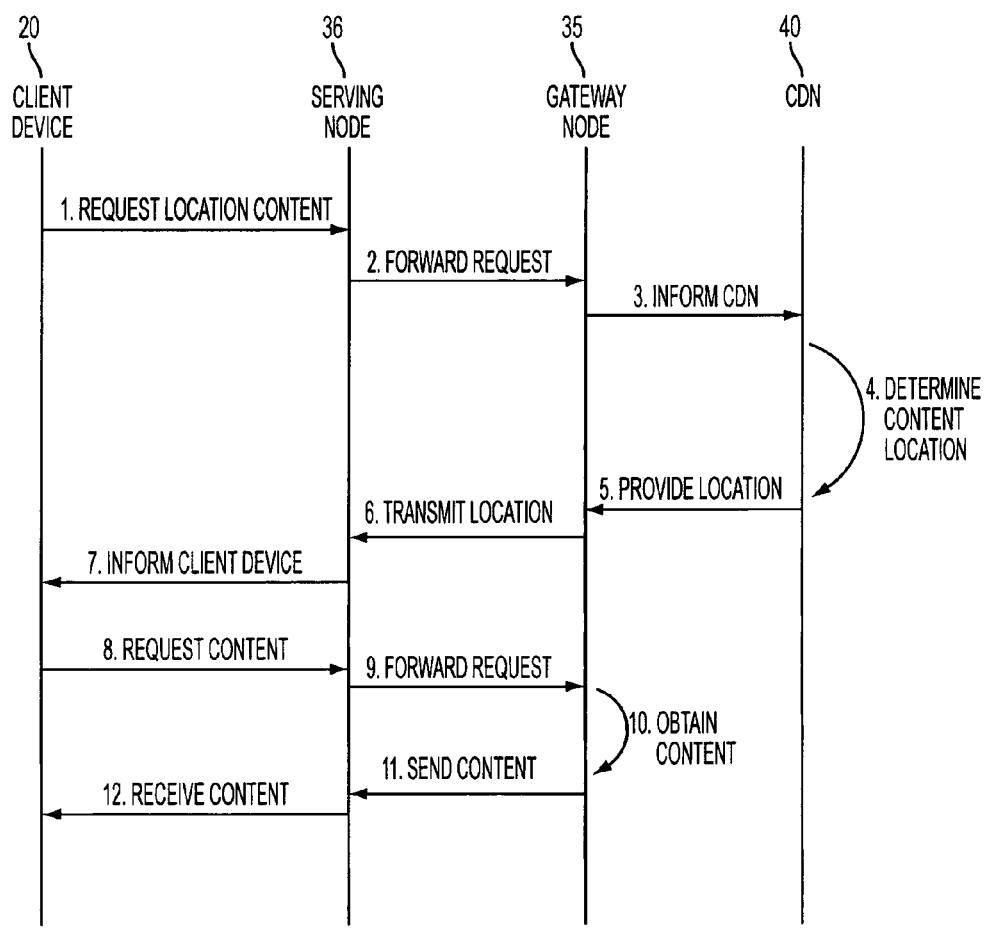
FIG. 3 illustrates a signaling process for the system of FIG. 2.
Figure 4:
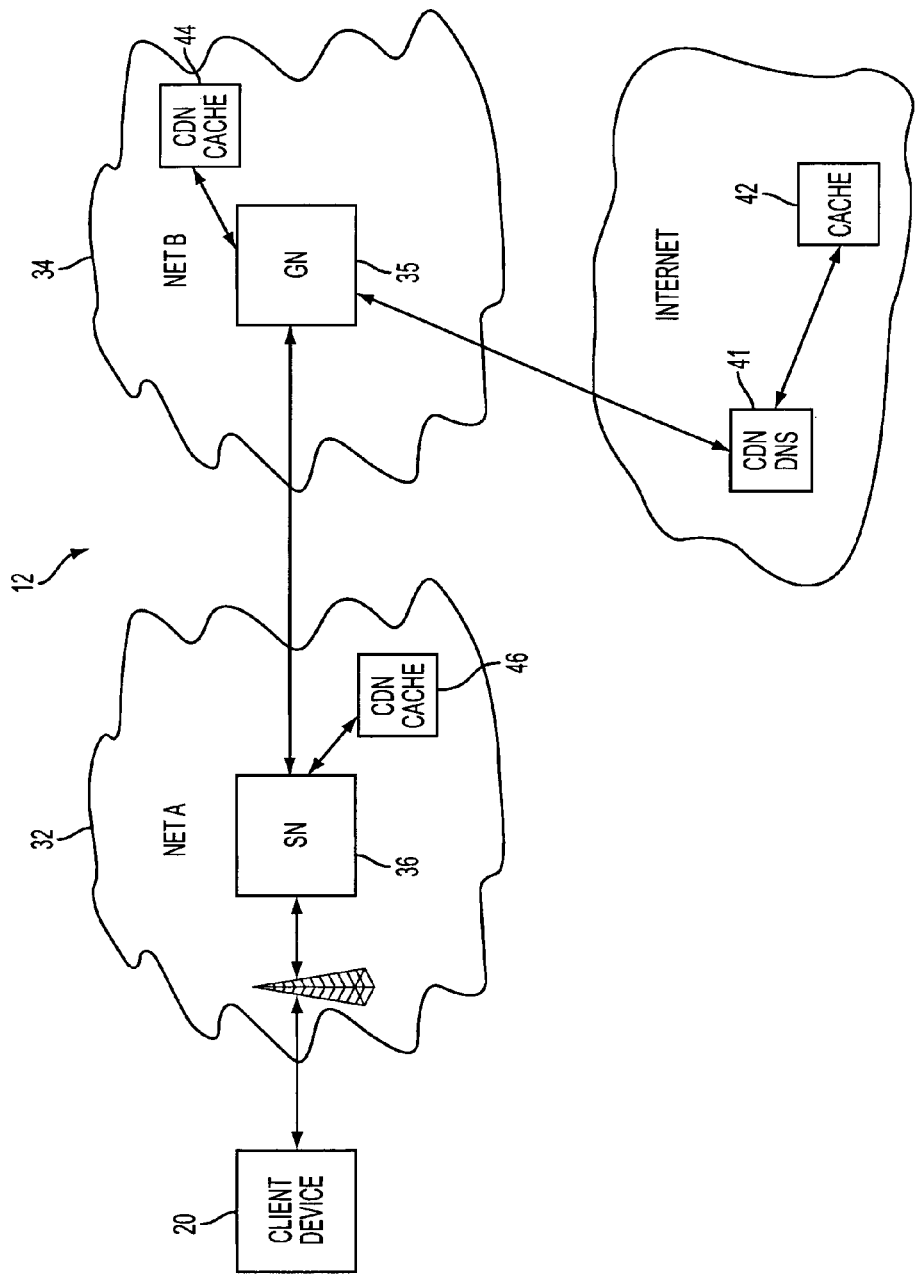
FIG. 4 is a schematic diagram of the system of FIG. 1 using a DNS redirect mechanism.
Figure 5:
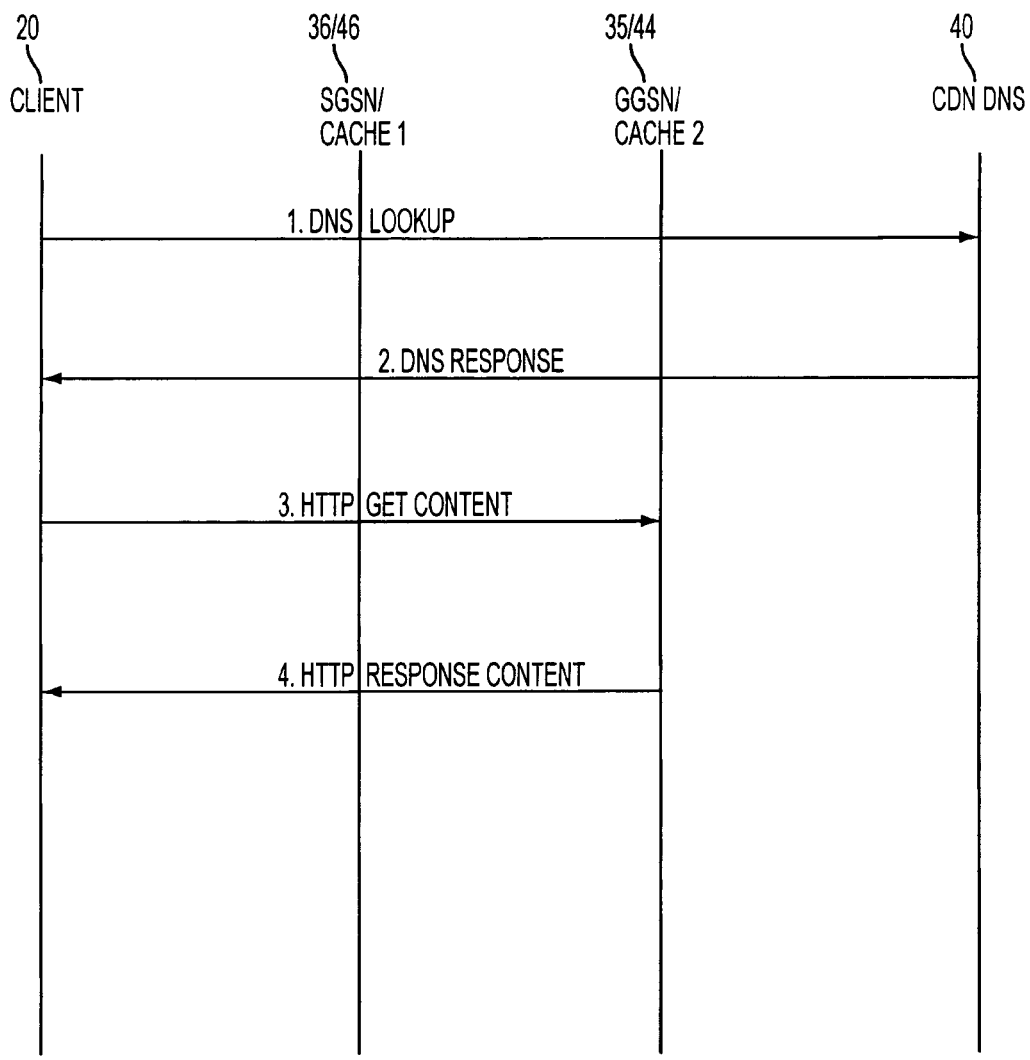
FIG. 5 illustrates a signaling process for the system of FIG. 4.
Figure 6:
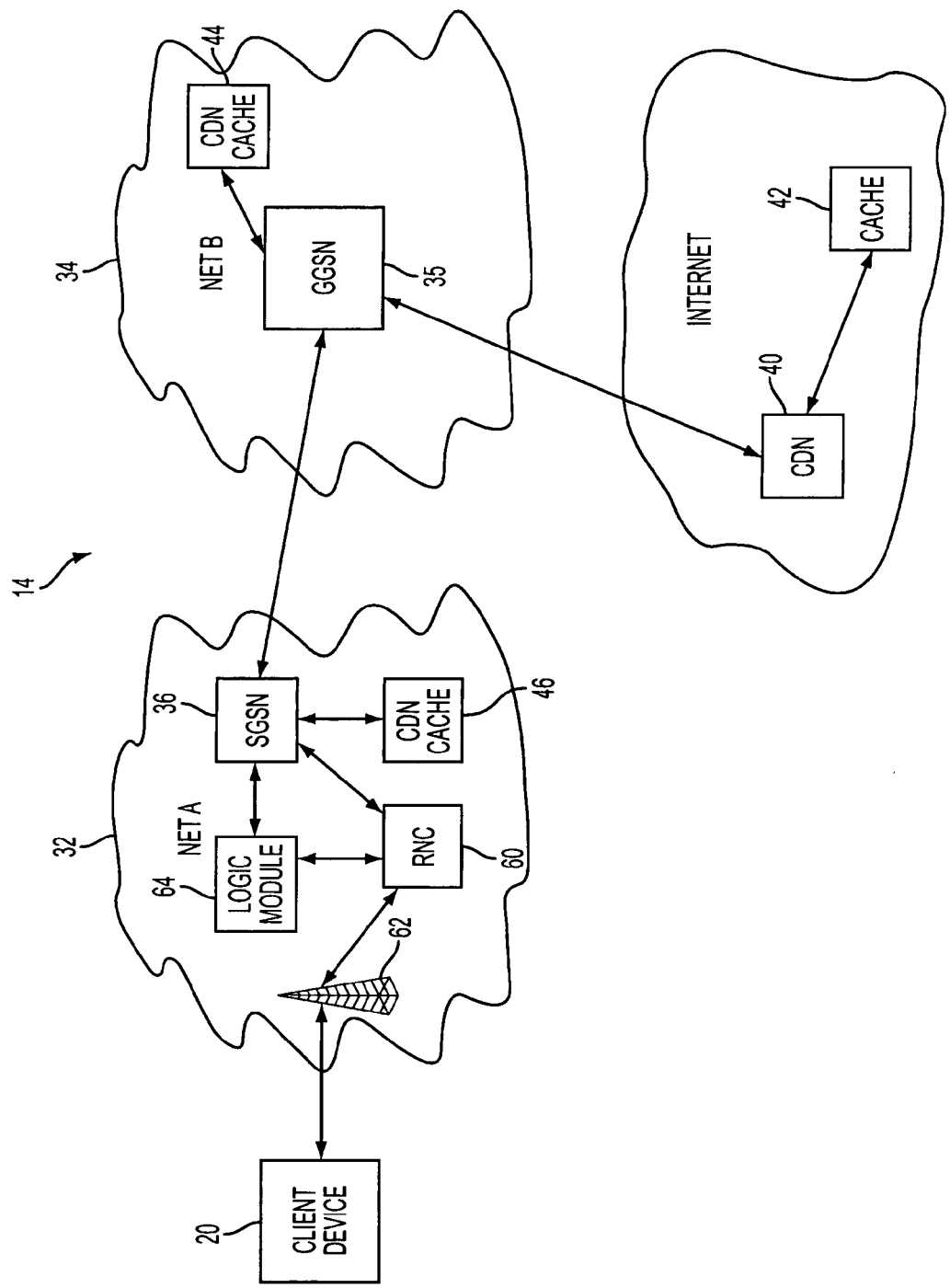
FIG. 6 is a schematic diagram of an HTTP-redirect based system for providing content to a client device according to an exemplary embodiment.

According to an exemplary embodiment illustrated in FIG. 6, there is a system 14 that uses a 3GPP architecture in which the serving node 36 is a Serving GPRS Support Node (SGSN) and the gateway node 35 is a Gateway GPRS Support Node. In addition, the Net A 32 includes a Radio Network Controller (RNC) 60 that links the SGSN 36 to a nodeB 62, which communicates with the user device 20. The structure and names shown in FIG. 6 are specific for a 3GPP architecture release 6 or lower. For higher releases, the nodeB 62 is replaced by an eNodeB, which also includes parts of the RNC capabilities, the RNC is removed, the SGSN is replaced by a Serving gateway (GW), the GGSN is replaced by Packet Data Network (PDN) GW, and so on. Although it was described above that the SGSN is replaced by the Serving GW and the GGSN is replaced by the PDN GW, it is noted that the replacement is more complex and involves some of the functionalities of the old components being performed by the new components and some of the functionalities being removed or replaced by new ones. More about the old and new components of the 3GPP network may be found in 3GPP TS 29.060, 3rd Generation Partnership Project; Technical Specification Group Core Network and Terminals; General Packet Radio Service (GPRS), GPRS Tunneling Protocol (GTP) across the GN and Gp interface (Release 8), which is incorporated herein by reference in its entirety.

In the following exemplary embodiments, the SGSN and GGSN nodes are used for describing the novel features. However, the novel features are applicable to other versions of the 3GPP and also to other network architectures that do not match an address of a client device with a geographical position of that client device.

According to the exemplary embodiment shown in FIG. 6, the client device 20 has been assigned an IP address by the GGSN 35, which address is topologically anchored at the GGSN 35. Hence, to other networks and/or computers on the Internet, the client device 20 appears to be located in Net B 34, at the GGSN 35. If the CDN 40 sends a packet addressed to the IP address of the client device 20, the packet is routed by Internet routers to the GGSN 35. The mobility mechanism, i.e., the GTP tunneling mechanism of the 3GPP network, tunnels then the packet from GGSN 35 to the SGSN 36 and from the SGSN 36 to the RNC 60 and then to the client device 20, which also thinks it is located at the GGSN 35 (as far as the IP domain is concerned). In the opposite direction, similar tunneling is performed.

While the 3GPP architecture has a tunneling mechanism for achieving the transmission of the package from the CDN 40 or other computer linked to the Internet to the client device 20, non 3GPP networks, to which the exemplary embodiments are applicable, may have other mechanism for directed the package to the client device 20.

The tunneling in the example shown in FIG. 6 "misleads" the CDN 40 as the CDN logic will "think" that the client device 20 is located at the GGSN 35, where the IP address is topologically anchored. Therefore, the CDN 40 will try to find the best possible cache with respect to that location, i.e., the location of the GGSN 35. The term cache is used in the following exemplary embodiments for simplicity. Other devices that are able to provide a desired content (i.e., video, audio, files, etc.) may be used instead of the cache. In the example shown in FIG. 6 the cache happens to be CDN Cache 44. Hence the client device 20 will be redirected there to fetch the desired content. The term "content" is used in the following exemplary embodiments to include video, audio or other files that are traditionally considered to be content. However, as shown in FIG. 6, there happens to be a CDN Cache 46 in Net A 32 that is better located than the CDN cache 44. Thus, a novel mechanism for redirecting the client device 20 from the cache 44 to cache 46 is discussed next.

According to the exemplary embodiment shown in FIG. 6, a discovery capability is provided in Net A 32 for discovering a cache that is closer to the client device 20 than the cache 44 identified by the CDN 40. The discovery capability may be implemented in software, hardware or a combination thereof. This capability is represented in FIG. 6 as element 64, i.e., logic module that may be implemented in software, hardware or a combination thereof. This module may be implemented at the RNC 60, at the SGSN 36 or may be distributed in the RNC 60, the SGSN 36 and/or other components of Net A depending on the type of network.

The logic module is configured to receive and search a message sent by the CDN 40 to the client device 20 prior to delivering the message to the client device 20. Once the logic module 64 receives the message, it compares the address of the cache 44 determined by the CDN 40 with a list (or a table) of other caches containing the desired content. The list may be stored in the Net A 32 or in another network. If the logic module 64 determines that another cache, for example, cache 46, is better for the client device 20, the logic module 64 may modify the message received from the CDN 40 via the GGSN 35, to indicate the location of the better cache 46. In one application, the logic module 64 adds an indication about the cache 46 to the message received from the CDN 40. However, in another application, the logic module 64 removes the IP address of the cache 44 and replaces that address with the IP address of cache 46.

Figure 7:
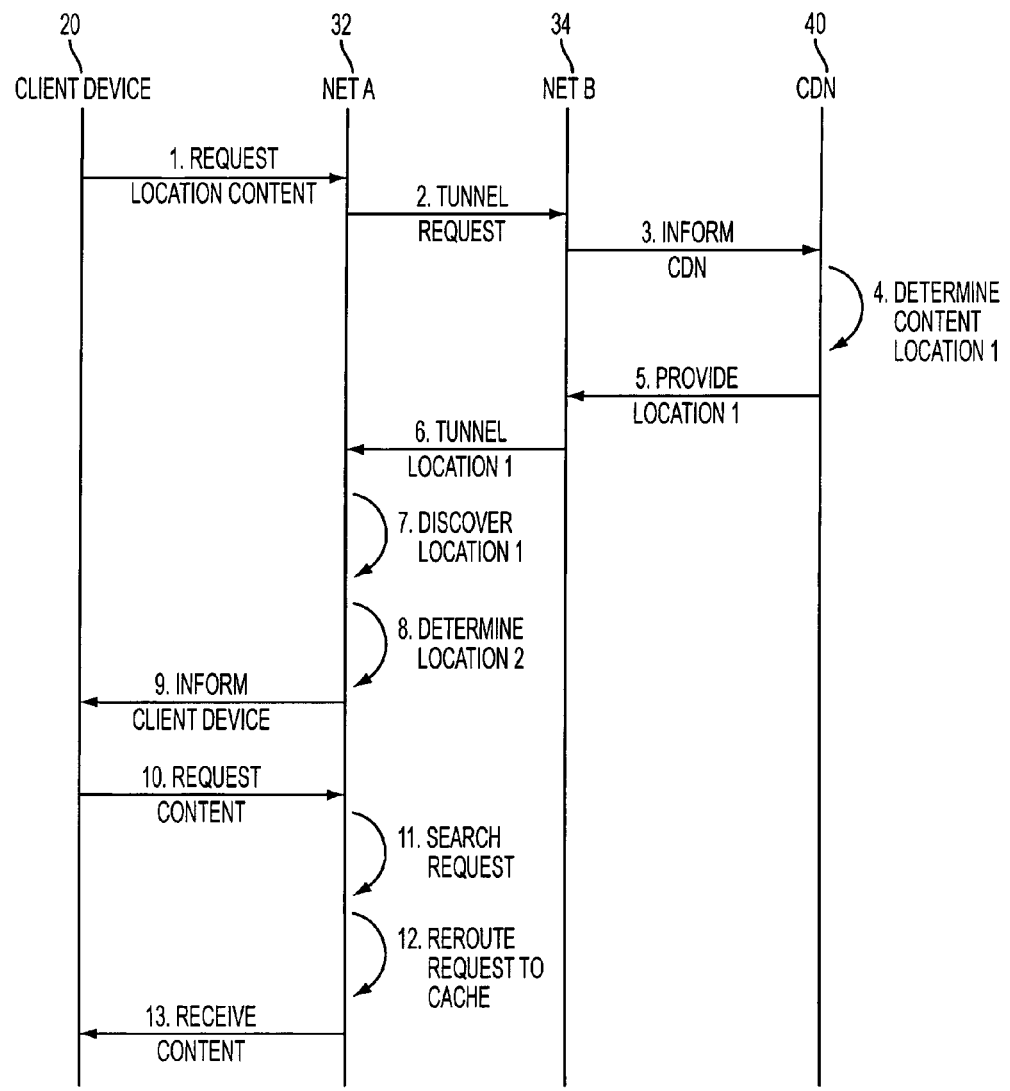
FIG. 7 illustrates a signaling process for the system of FIG. 6 according to an exemplary embodiment.

The steps taking place for discovering the better cache for client device 20 are discussed with regard to FIG. 7. The discovering and rerouting mechanisms of the logic module 64 are considered to be HTTP based in this example. Client device 20 sends a request location content in step 1 to the SGSN 36 of the net A 32. The SGSN 36 tunnels the request in step 2 to the GGSN 35 of Net B 34. In step 3, the GGSN 35 informs the CDN 40 about the client device's request. In step 4 the CDN 40 determines the closest (if only the distance is contemplated but if a set of parameters of the connection between the client device and the cache is considered, than a cache that is not necessarily the closest may be determined) cache 44 to the client device 20. A message including the location (IP address for example) of the cache 44 is sent in step 5 to the GGSN 35, which tunnels the message in step 6 to the SGSN 36. In step 7, the logic module 64 discovers the location of the cache 44 within the package sent by the CDN 40 and compares that location with the locations of other caches. The redirect message received from the CDN 40 may be implicit, which is the case for a CDN with a DNS-based redirection. In that situation, the redirect message is simply a DNS reply message. For a HTTP-based CDN, the redirection message is explicit, i.e., in the form of an HTTP REDIRECT message.

In step 8 the logic module 64 determines the location of a better cache 46 and informs in step 9 the client device 20 about this result. As discussed above, the logic module 64 may add an indication to the message about the location of cache 46 or may substitute the location of cache 44 with the location of cache 46, depending on the architecture of the network and the redirect mechanism used by the network.

The client requests the content in step 10 and the request is searched in step 11 and directed in step 12 by the SGSN 36 in Net A 32 to the cache 46 instead of being allowed to travel to the GGSN 35 in Net B 34. Once the content from cache 46 is retrieved, the content is provided in step 13 to the client device 20. Thus, in this way, a closer cache 46 is used to download the specific content and the messages are handled by components of Net A 32 in which the client device 20 is roaming instead of the components of Net B 34, shortening the interaction time and easing the traffic along Net A 32 to Net B 34.

The rerouting mechanism for this specific example is discussed next. Once the request in step 10 reaches the SGSN 36 in a GTP tunnel from RNC 60, the SGSN 36 will inspect the inner IP packet header of the received request packet. If the IP destination address in that header specifies a host (for example, cache 46) in the same network Net A 32 (or otherwise specified, e.g., as a list of addresses), the SGSN 36 will forward the packet to that destination in a dedicated tunnel and not in the regular next hop GTP tunnel. The dedicated tunnel may be established during the configuration of the CDN cache node or on the fly. In the example of FIG. 6 this means that the packet is forwarded by the SGSN 36 to cache 46 in the dedicated tunnel terminated there. If the destination does not meet the above noted conditions, the packet is forwarded along the regular next hop GTP tunnel towards the GGSN 35.

Figure 8:
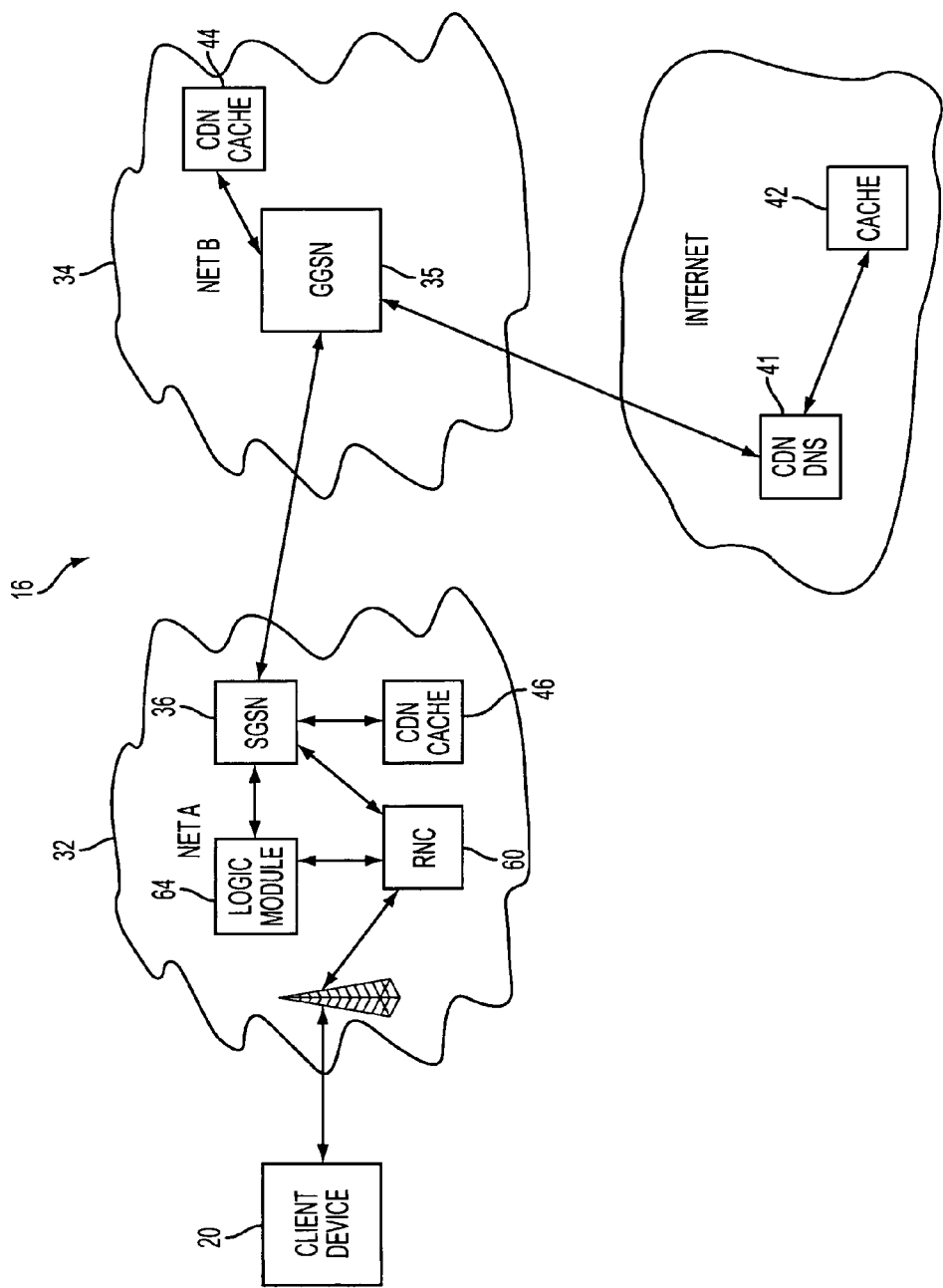
FIG. 8 is a schematic diagram of a DNS-redirect based system for providing content to a client device according to an exemplary embodiment.
Figure 9:
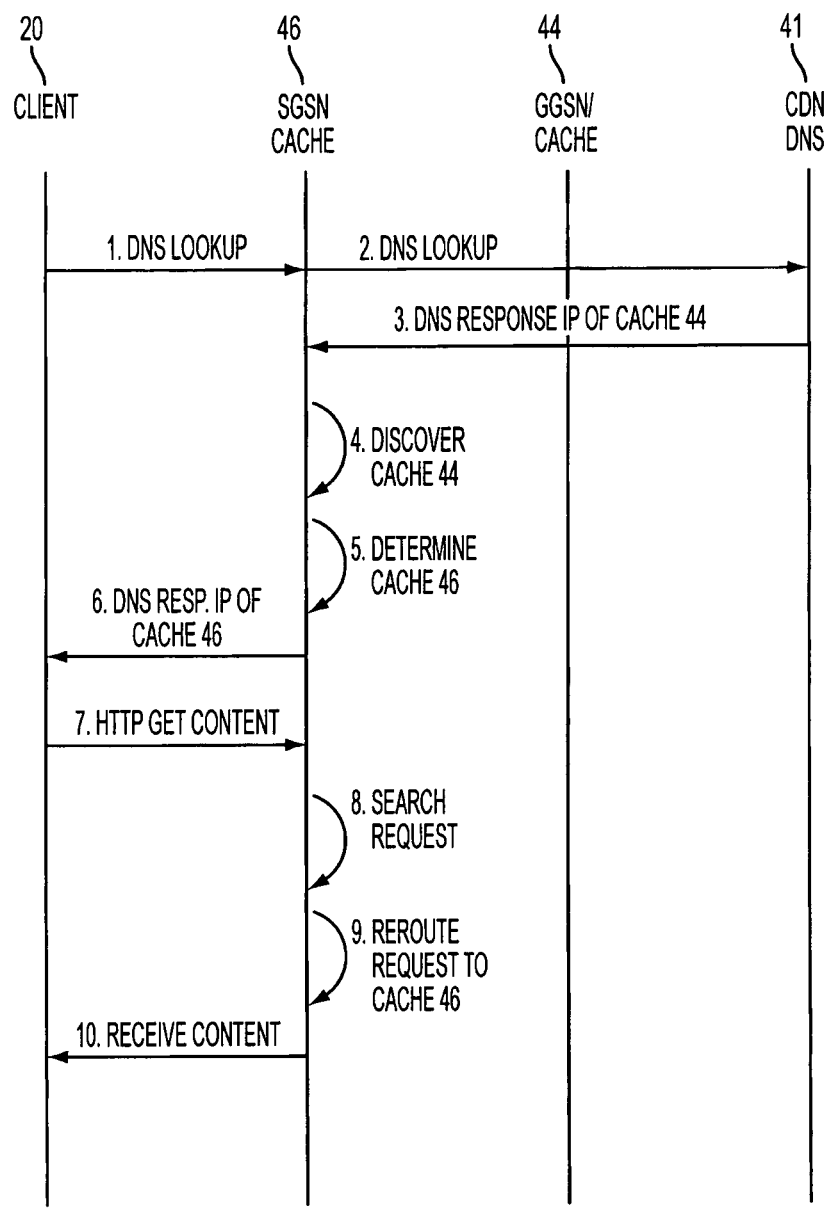
FIG. 9 illustrates a signaling process for the system of FIG. 8 according to an exemplary embodiment.

The example discussed with regard to FIG. 6 used an HTTP redirect mechanism. However, the novel features described by the exemplary embodiments may be implemented in other redirect mechanisms, for example, a DNS redirect mechanism. Such a mechanism is illustrated in FIG. 8. The system 16 of FIG. 8 is similar to the system 14 of FIG. 6 except that the CDN DNS 41 redirect mechanism is used. FIG. 9 illustrates simplified steps performed in such a mechanism. In step 1, the client device 20 performs a DNS lookup for the desired content. This request is transmitted in step 2 by the SGSN 36 to the CDN DNS 41 via the GGSN 35. The CDN DNS 41 provides in step 3 a response including the address of the cache 44, which is "seen" by the CDN 40 as the best suitable cache for client device 20. In step 4 the SGSN 36 discovers the address of the cache 44 and determines in step 5 whether other caches are better for the client device 20. If such better cache is determined in step 5 by the SGSN 36, the message from the CDN DNS 41 is modified to indicate the presence of cache 46 and the message is sent in step 6 to the client device 20. In one embodiment the address of the cache 44 is replaced with the address of the cache 46 while in another embodiment the address of cache 46 is added to the message while maintaining the address of cache 44.

In step 7 the client device 20 sends an HTTP request of the desired content. The SGSN 36 intercepts the message and searches in step 8 the request. If the address of the cache 46 is determined, the SGSN 36 reroutes the request for content to the cache 46 and in step 10 the client device 20 receives the desired content.

The above exemplary embodiments have described how a location of a first cache is discovered in a message sent from the CDN to the client device, how the location of a second cache, which is more suitable for the client device, is added to the message, and how the request for the desired content from the client device is rerouted to the second cache. These processes have been described in the context of 3GPP networks with HTTP- or DNS-based redirection mechanisms. However, the novel features of the exemplary embodiments are applicable to other networks with the same or different redirections mechanisms.

To more clearly illustrate the applicability of the novel features, a generic network with a generic redirection mechanism is discussed next. The client device is interested to use not only content but also streams or services. The term "asset" is thus used in the following as a generic term for covering at least one of content, streams and services. Instead of a cache a data device is used with regard to this exemplary embodiment. The data device may be a cache and/or a server that provides the service and/or stream. Instead of the SGSN a serving node is used and instead of the GGSN a gateway node is used. One skilled in the art would recognize that depending of the architecture of the network, the type of asset/data requested by client and other factors, the asset, the data device, the serving node, the gateway node and the service provider may correspond to different components than those shown in FIGS. 6 and 8.

Figure 10:
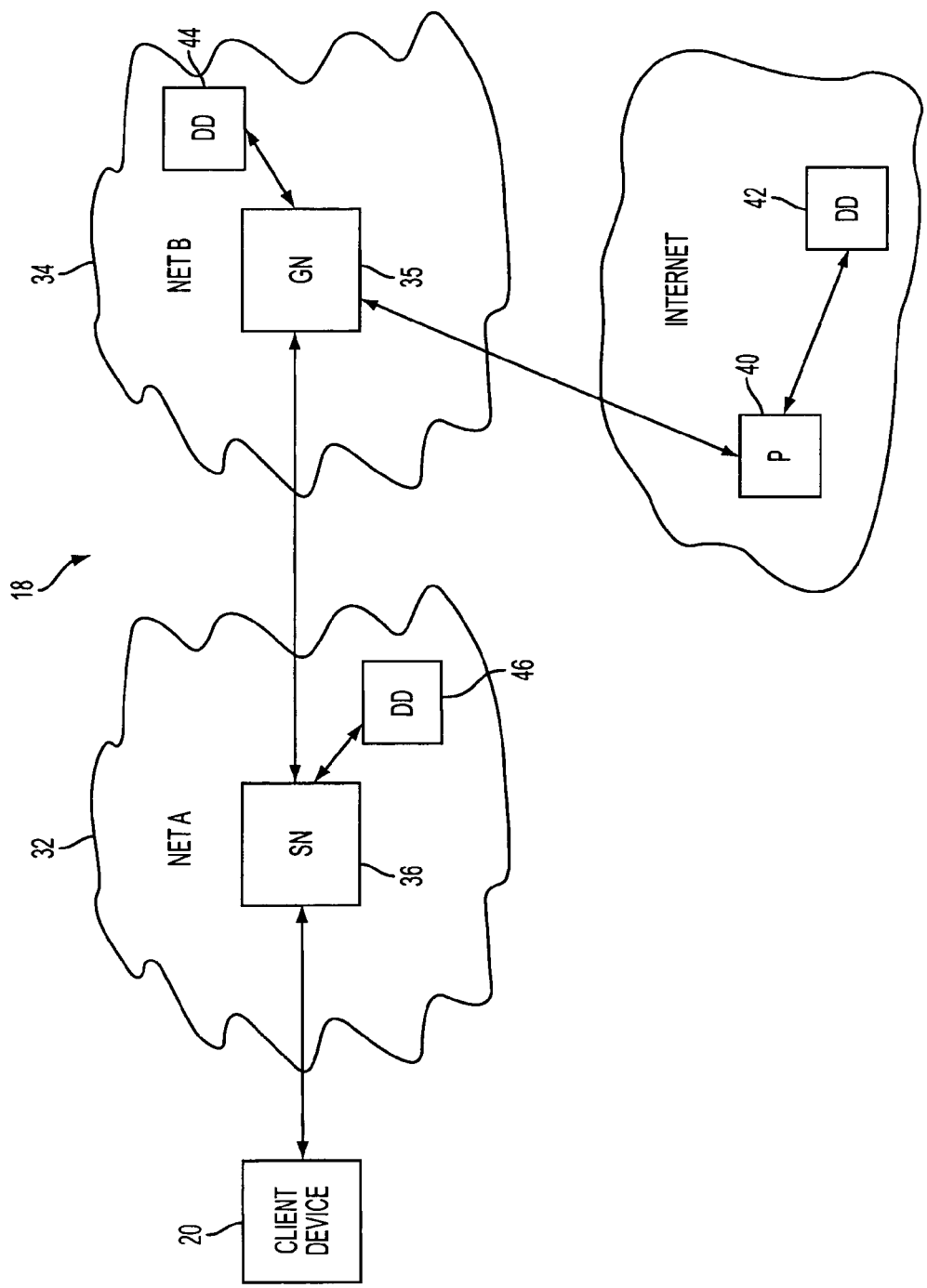
FIG. 10 is a schematic diagram of a generic system for providing the content to the client device according to an exemplary embodiment.

A system 18 having these generic features is shown in FIG. 10. FIG. 10 shows a provider P 40 that is connected via Internet to the gateway node GN 35. Both the provider P 40 and the gateway node GN 35 may be located close to data devices DD 42 and 44, respectively. The GN 35 belongs to a network Net B 34. The GN 35 may communicate with a serving node SN 36, that belongs to a network Net A 32. The SN 36 communicates with the client device 20 and may be located close to data device DD 46. In one application the SN 36 and GN 35 may belong to a same network. In another application, each of the Net A 32 and Net B 34 may have its own gateway nodes and serving nodes.

A characteristic of the system 18 shown in FIG. 10 is that an address (may be an IP address or other addresses) of the client device 20 is related to the GN 35 and not to the SN 36, to which the client device 20 is connected. This feature makes other devices to "see" the client device 20 as being present in Net B 34 and not in Net A 32. The system 18 is configured to overcome this "misperception" of the client device 20 and thus, discover a data device DD 46 that is more suitable for the client device 20 than the data device DD 44 determined by the provider P 40.

The term "more suitable" describes a metric that is considered when determining which data device DD is better for the client device. One example of such a metric is when the client device desires a shortest download time (which may be associated with the geographic position of the data device relative to the client device but also the bandwidth capability of the link between the data device and the client device) and a highest availability of the asset. Each of these factors may be assigned a weight/importance and an overall score may be calculated for determining the "more suitable" data device. An oversimplified example is when the matrix includes only one entry, e.g., a distance between the client device and the data device. Those skilled in the art would recognize that the metric discussed above may include other factors and various formulae may be used for determining a score that characterizes the "more suitable" data device.

Figure 11:
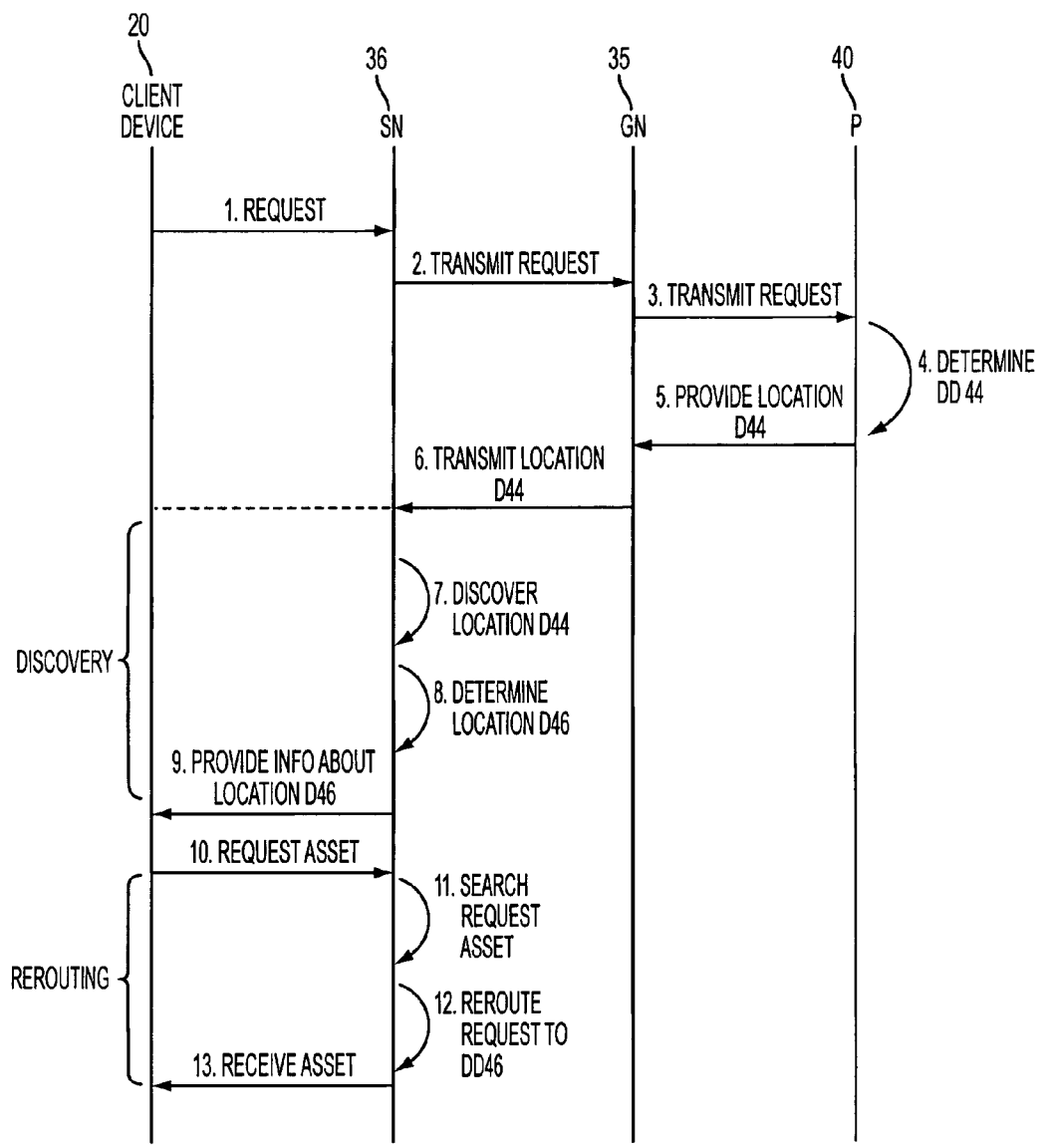
FIG. 11 illustrates the signaling process for the system of FIG. 10 according to an exemplary embodiment.

The steps of the process for obtaining the desired asset are illustrated in FIG. 11. The client device 20 sends in step 1a request for the desired asset. The SN 36 receives and transmits the request to GN 35, which in turn receives and transmits in step 3 the request to P 40. The P 40 determines in step 4 that data device 44 is more suitable for client device 20 and provides the location of the data device 44 to the GN 35 in step 5. The GN 35 transmits this location to SN 36 in step 6. The next two steps form the discovery phase that takes place in the SN 36 or other components of Net A 32. Having the message from P 40, the SN 36 discovers/searches the location of the DD 44 in step 7 and determines in step 8 the new "more suitable" DD 46. The location of the new DD 46 is added to the message that is transmitted from the SN 36 to the client device 20 in step 9. The client device sends a request for the desired asset in step 10 and upon receiving this request, the SN 36 searches in step 11 the request and reroutes in step 12 the request to the "more suitable" DD 46. The desired asset is provided in step 13 to the client device 20. Steps 11 and 12 described above are associated with a rerouting phase during this process.

One advantage of this embodiment is the more efficient utilization of the mobile core network in a content distribution scenario. For example, as shown in FIG. 10, by fetching the content from the data device 46, which is closer to the client device 20, the process reduces the access time to the content and hence enhances the quality of the service for the user. This "closer" fetching also reduces the mobile operator's cost as less data traffic (less bits) has to be transported over Net B 34 when the content is provided from the DD 46 instead of DD 44. In other words, the operator of Net B 34 needs to use no bandwidth (after the redirection performed in the SN 36) when the subscribed client device 20 downloads the desired asset as the desired asset is provided exclusively via Net A 32. Simply stating, less bits transported by a network means that the network operator is able to serve more content to end users without increasing its capacity (Net B in this example) as the traditional network operator would have done without this novel process.

Other advantages of one or more of the exemplary embodiments disclosed above are now discussed. CDN caches and/or data devices may be distributed and used in locations that would be bypassed and effectively not accessible with traditional CDN techniques due to IP tunnels or other similar mechanisms. The discovery mechanism discussed above would lead to a more efficient utilization of mobile core network since caching can be done closer to the terminals than with traditional non-tunnel compatible CDN solutions.

The exemplary embodiments are applicable to the most common CDN redirection techniques (DNS-based redirection and HTTP-based redirection). They are also applicable to non-GTP IP tunneling, e.g., Proxy Mobile IP (PMIP) that is another mobility protocol included in 3GPP release 8.

According to the exemplary embodiments, the data devices may be provided by the network operator and may be offered as a service to CDN providers. This arrangement provides a new business relationship between the mobile network operators and content providers. An agreement between these parties may be made where the content providers share revenue with the operators who enable access to the asset with lower latency to end users based on the novel features disclosed herein.

The novel features may also be useful in other contexts than CDNs. These novel features may be used, for example, as a mechanism to do chained updates to messages. For instance, location specific content could be inserted or updated in messages exchanged between client devices and/or the client device and a source of data. At the source, some generic content (for example, some default advertisement) is inserted. Then as the message is forwarded closer to the client device, that content is updated/expanded with advertisements more relevant to the client device's actual location. If no updates are made, the user sees the default advertisement introduced by the source. For this situation, during the discovery phase, the original ad and/or location from which the ad may be obtained is not removed.

Figure 12:
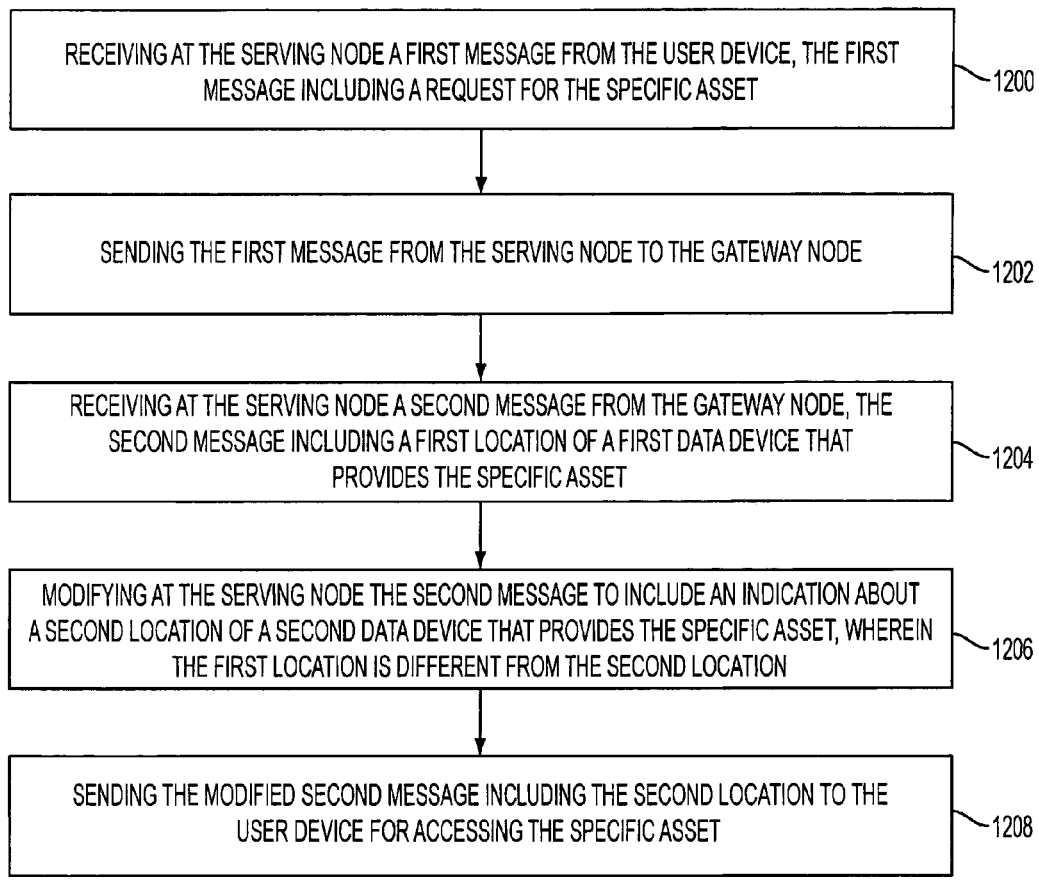
FIG. 12 is a flow chart illustrating steps of the signaling process of FIG. 11.

According to an exemplary embodiment, steps of a method for providing a user device location information about a data device that provides a specific asset are illustrated in FIG. 12. The user device is present in a network that includes at least a serving node and an address of the user device is indicative of a gateway node that is different from the serving node. The method includes a step 1200 of receiving at the serving node a first message from the user device, the first message including a request for the specific asset, a step 1202 of sending the first message from the serving node to the gateway node; a step 1204 of receiving at the serving node a second message from the gateway node, the second message including a first location of a first data device that provides the specific asset; a step 1206 of modifying at the serving node the second message to include an indication about a second location of a second data device that provides the specific asset, wherein the first location is different from the second location; and a step 1208 of sending the modified second message including the second location to the user device for accessing the specific asset.

Figure 13:
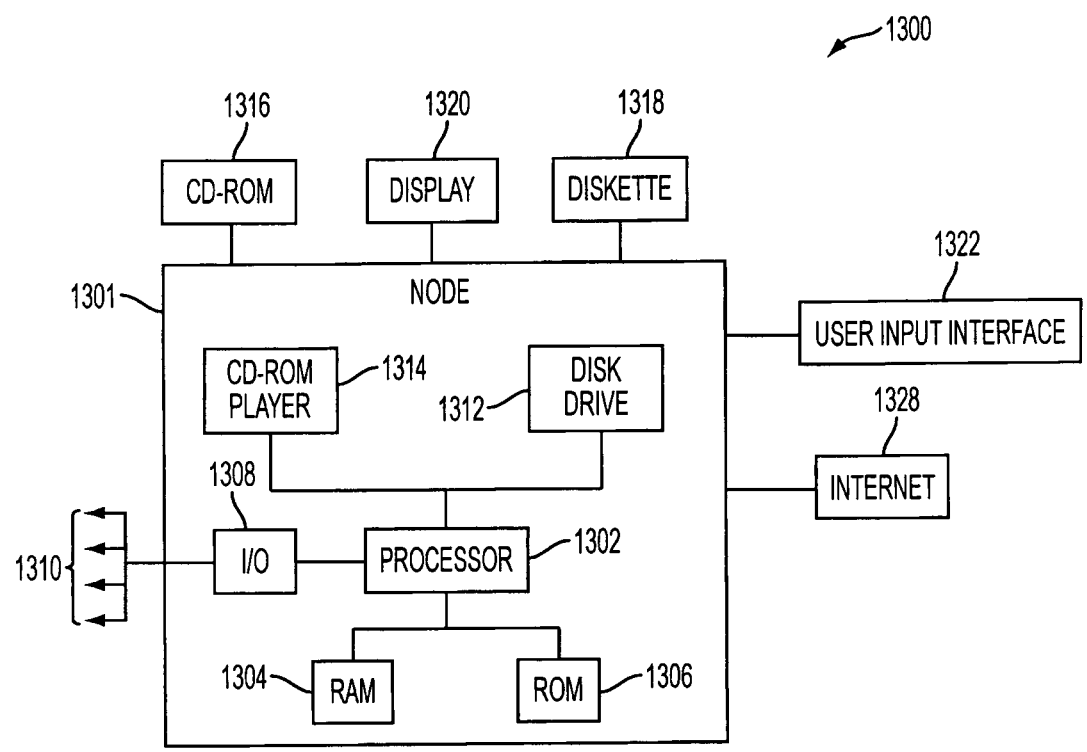
FIG. 13 is a schematic diagram of a node shown in FIG. 6, 8, or 10.

An example of a representative computing system capable of carrying out operations in accordance with the nodes of the exemplary embodiments is illustrated in FIG. 13. Hardware, firmware, software or a combination thereof may be used to perform the various steps and operations described herein. The computing structure 1300 of FIG. 13 is an exemplary computing structure that may be used in connection with such a system.

The exemplary computing arrangement 1300 suitable for performing the activities described in the exemplary embodiments may include server 1301, which may correspond to any of the elements 35, 36, and/or 40 shown in FIGS. 6, 8, and 10. Such a server 1301 may include a central processor (CPU) 1302 coupled to a random access memory (RAM) 1304 and to a read-only memory (ROM) 1306. The ROM 1306 may also be other types of storage media to store programs, such as programmable ROM (PROM), erasable PROM (EPROM), etc. The processor 1302 may communicate with other internal and external components through input/output (I/O) circuitry 1308 and bussing 1310, to provide control signals and the like. The processor 1302 carries out a variety of functions as is known in the art, as dictated by software and/or firmware instructions.

The server 1301 may also include one or more data storage devices, including hard and floppy disk drives 1312, CD-ROM drives 1314, and other hardware capable of reading and/or storing information such as DVD, etc. In one embodiment, software for carrying out the above discussed steps may be stored and distributed on a CD-ROM 1316, diskette 1318 or other form of media capable of portably storing information. These storage media may be inserted into, and read by, devices such as the CD-ROM drive 1314, the disk drive 1312, etc. The server 1301 may be coupled to a display 1320, which may be any type of known display or presentation screen, such as LCD displays, plasma display, cathode ray tubes (CRT), etc. A user input interface 1322 is provided, including one or more user interface mechanisms such as a mouse, keyboard, microphone, touch pad, touch screen, voice-recognition system, etc.

The server 1301 may be coupled to other computing devices, such as the landline and/or wireless terminals and associated watcher applications, via a network. The server may be part of a larger network configuration as in a global area network (GAN) such as the Internet 1328, which allows ultimate connection to the various landline and/or mobile client/watcher devices.

The disclosed exemplary embodiments provide a serving node, a method and a computer program product for providing a location of a better data device to a client device. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for providing to a user device location information of a data device that provides a specific asset, wherein the user device is present in a network that includes at least a serving node and an address of the user device is indicative of a gateway node such that the user device is seen as being located at the gateway node although the user device is being located at the serving node, and the gateway node is different from the serving node, the method comprising:
   receiving at the serving node a first message from the user device, the first message including a request for the specific asset;
   sending the first message from the serving node to the gateway node;
   receiving at the serving node a second message from the gateway node, the second message including a first location of a first data device that provides the specific asset;
   modifying at the serving node the second message to include an indication about a second location of a second data device that provides the specific asset, wherein the first location is different from the second location; and
   sending the modified second message including the second location to the user device for accessing the specific asset.

2. The method of claim 1, wherein the first message is an HTTP request or a DNS request.

3. The method of claim 1, further comprising:
   receiving at the serving node a third message from the user device, the third message including a request for the specific asset and the second location; and
   obtaining the specific asset from the second data device such that no data traffic occurs over a network associated with the gateway node to increase a data transport capacity of the network of the gateway node.

4. The method of claim 1, wherein the network is a tunneled network.

5. The method of claim 1, wherein the address of the user device is an IP address.

6. The method of claim 1, wherein the asset includes at least one of a video, audio, a file, a stream, or a service.

7. The method of claim 1, wherein the data device is a data storage device.

8. The method of claim 1, wherein the modifying step further comprises:
   searching the received second message for the first location;
   comparing the first location with a list of locations of data devices providing the specific asset;
   determining that the second location of the second data device is better for the user device than the first location of the first data device; and
   adding the indication about the second location of the second data device to the second message.

9. The method of claim 8, further comprising:
   analyzing plural factors characterizing the user device, the first data device, the second device and relationships among these elements for establishing a first score of the first data device and a second score for the second data device; and
   deciding the better user device based on the first and second scores.

10. The method of claim 8, further comprising:
    removing the first location of the first data device from the second message.

11. The method of claim 1, further comprising:
    receiving at the serving node a third message from the user device, the third message including a request for the specific asset and the second location;
    searching the third message to detect the second location; and forwarding the third message from the serving node directly to the second data device when the second location is present in the third message such that the third message is not sent from the serving node to the gateway node.

12. The method of claim 1, wherein the modifying step further comprises:
modifying the second message only when the second location of the second data device is better for the user device than the first location of the first data device.

13. The method of claim 12, wherein the second data device is better for the user device than the first data device if a time associated with accessing the specific asset from the second data device is shorter than a time of accessing the specific asset from the first data device.

14. The method of claim 1, wherein the serving node belongs to a first network, the gateway node belongs to a second network, different from the first network, the user device belongs to the second network but is located in the first network, the first data device belongs to the second network, and the second data device belongs to the first network.

15. The method of claim 1, further comprising:
determining within a content distribution network, different from the first and second networks, the first location of the first device.

16. The method of claim 1, wherein the sending the first message step comprises:
hiding the real location of the user device in the serving node such that the user device appears to be geographically present in the second network for the content distribution network.

17. A serving node for providing to a user device location information about a data device that stores a specific asset, wherein the user device is part of a network that includes the serving node, and an address of the user device is indicative of a gateway node such that the user device is seen as being located at the gateway node although the user device is being located at the serving node, the serving node comprising:
an input/output interface configured to receive a first message from the user device, the first message including a request for the specific asset; and
a processor connected to the input/output interface and configured to
receive a first message from the user device, the first message including a request for the specific asset,
send the first message to the gateway node,
receive a second message from the gateway node, the second message including a first location of a first data device that provides the specific asset,
modify the second message to include an indication about a second location of a second data device that provides the specific asset, wherein the first location is different from the second location, and
send the modified second message including the second location to the user device for accessing the specific asset.

18. The serving node of claim 17, wherein the processor is further configured to:
search the received second message for the first location;
compare the first location with a list of locations of data devices capable of providing the specific asset;
determine that the second location of the second data device is better for the user device than the first location of the first data device, and
add the indication about the second location of the second data device to the second message.

19. The serving node of claim 17, wherein the input/output interface is configured to receive a third message from the user device, the third message including a request for the specific asset and the second location, and the processor is further configured to search the third message to detect the second location, and forward the third message from the serving node directly to the second data device when the second location is present in the third message such that the third message is not sent from the serving node to the gateway node.

20. The serving node of claim 17, wherein the network has an architecture based on a third generation partnership project (3GPP), the serving node is at least one of a serving general packet radio service (GPRS) support node, a radio network controller (RNC) or a serving gateway (S-GW).

21. A network hardware device having a computer readable medium including computer executable instructions, wherein the instructions, when executed, implement a method for providing to a user device location information of a data device that provides a specific asset, wherein the user device is present in a network that includes at least a serving node and an address of the user device is indicative of a gateway node that is different from the serving node, the method comprising:
receiving at the serving node a first message from the user device, the first message including a request for the specific asset;
sending the first message from the serving node to the gateway node;
receiving at the serving node a second message from the gateway node, the second message including a first location of a first data device that provides the specific asset;
modifying at the serving node the second message to include an indication about a second location of a second data device that provides the specific asset, wherein the first location is different from the second location; and
sending the modified second message including the second location to the user device for accessing the specific asset.

* * * * *